UNITED STATES PATENT OFFICE.

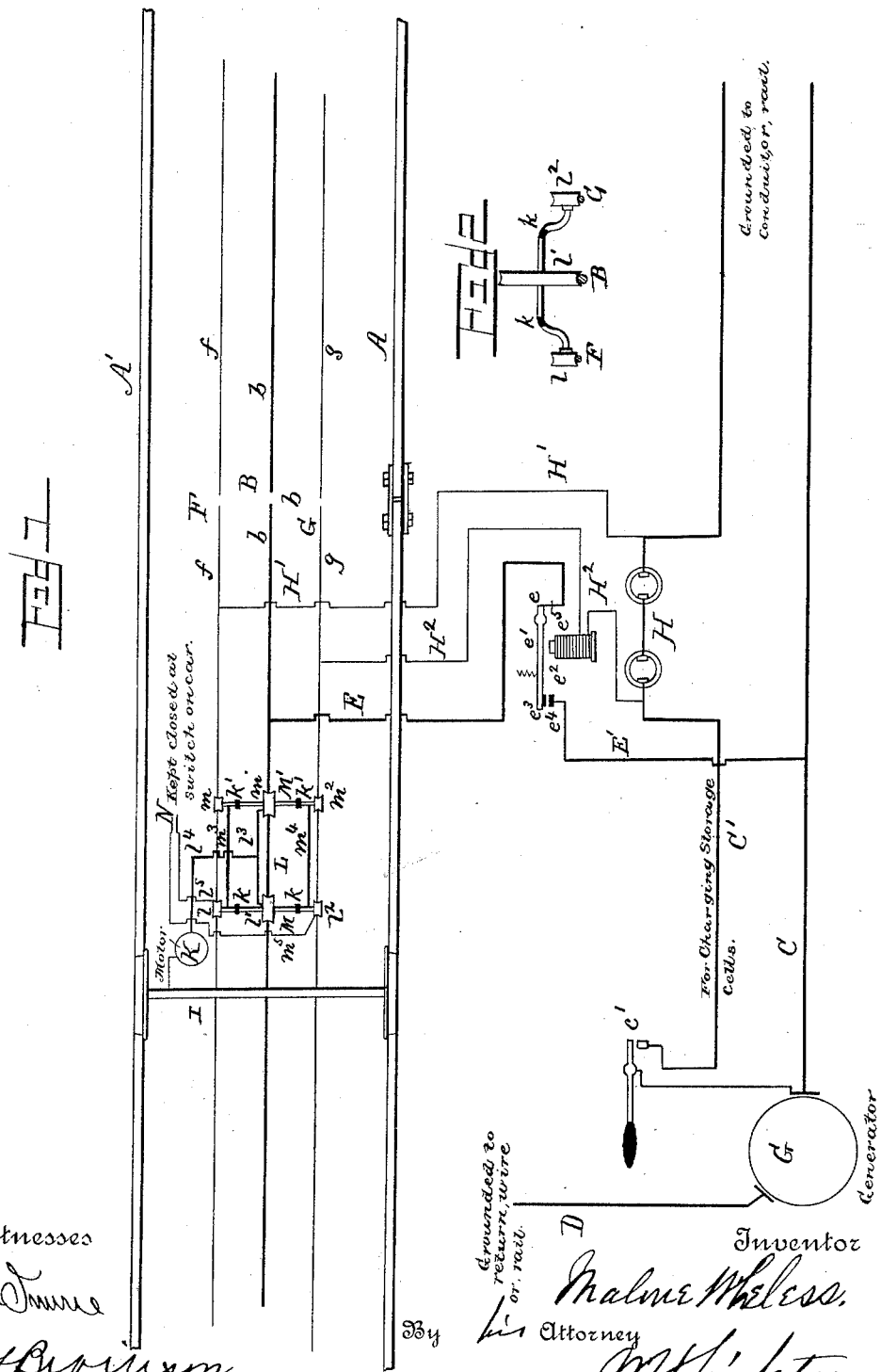

MALONE WHELESS, OF NASHVILLE, TENNESSEE.

ELECTRIC RAILWAY.

SPECIFICATION forming part of Letters Patent No. 468,164, dated February 2, 1892.

Application filed December 1, 1891. Serial No. 413,722. (No model.)

*To all whom it may concern:*

Be it known that I, MALONE WHELESS, a citizen of the United States, residing at Nashville, in the county of Davidson and State of Tennessee, have invented certain new and useful Improvements in Electric Railways; and I do declare the following to be a full, clear, and exact description of the invention, such as will enable others skilled in the art to which it appertains to make and use the same, reference being had to the accompanying drawings, and to the letters of reference marked thereon, which form a part of this specification.

Figure 1 represents the system diagrammatically. Fig. 2 is an end view of the trolley, the axles being arched.

This invention relates to an improved system for electric railway, designed more especially for underground work.

In the annexed drawings, the letters A A' indicate the two lines of rails of a railroad-track. Running along between these rails is the bare working conductor B, made in sections $b$, insulated from one another at $b'$. From the generator G an insulated main power-line C runs along the track and has the ground D. From each section $b$ of the working conductor B a feed-wire E runs to one end $e$ of the armature $e'$ of an ordinary telegraphic relay $e^2$, such armature having a carbon contact $e^3$ at the other end. Adjacent to the contact $e^3$ is another carbon contact $e^4$, from which another feed-wire E' runs to the insulated power-line C. Running parallel with the working conductor B—one on each side thereof—are two bare wires F and G, made in insulated sections $f$ and $g$, coincident with sections $b$ of the working conductor B.

At a convenient point is located a storage-battery H, from which runs a wire H', one side to the section $f$ of the wire F and on the other side a wire H² around the magnet $e^5$ of the relay $e^2$ and to the section $g$ of wire G. All the batteries H along the line of track are connected up to the generator by a charging-line C', in which is a switch $c'$. On the track is the car I, having the usual motor K, connected in the usual way.

Secured underneath the car I is the trolley L. This consists of the two transverse axles M M', carrying the wheels $l$ $l'$ $l^2$ $m$ $m'$ $m^2$. These axles are provided with insulators $k$ $k'$, so that each axle is divided into three parts and each wheel on an axle is thus insulated from the others. As shown, the middle wheels may be larger than the others. The two middle wheels $l'$ and $m'$ are electrically connected by the wire $l^3$ and the wheels $l$ and $m$ and $l^2$ and $m^2$ by the wires $m^3$ $m^4$, respectively. From the wire $l^3$ a feed-wire $l^4$ runs to the motor K, and from the wheels $l$ and $l^2$ or the ends of the axle M wires $l^5$ $m^5$ run to a switch N on the car. This trolley L, when in place, has its wheels $l'$ and $m'$ on the bare working conductor B, its wheels $l$ $m$ on the wire F, and its wheels $l^2$ $m^2$ on the wire G.

In a system thus constructed the magnets $e^5$ are vitalized when the trolley enters a section by a current from the storage-battery H and the main current is taken from the main power-line C, as will be described. When the motor-circuit is closed in the usual way and the switch N also closed, the action is as follows: The current from the battery H passes through the wire H² and the magnet $e^5$, thus vitalizing it, through section $g$ of the wire G, wheel $m^2$, wire $m^4$, wheel $l^2$, wire $m^5$, switch N, wire $l^5$, wheel $l$, wire $m^3$, wheel $m$, section $f$ of the wire F, and wire H' to battery H. As soon as the magnet $e^5$ is vitalized the armature $e'$ is drawn down and the power-current streams from the power-line C through the feeders E and E' and the armature $e'$ to the section $b$ of the working conductor, and thence through the wheel $m'$ and wires $l^3$ and $l^4$ to the motor. The trolley is made with two sets of wheels, each on separate axles, so as to span the insulation of the wires on which it bears. This system produces a simple and efficient device. The circuit which vitalizes the magnets is all metallic and requires only a current of low potential, as there is but slight escape. At any time the batteries along the line may be restored by turning the switch $c'$ and throwing the current along the line C' and into these batteries.

Having described my invention, what I claim is—

A prime conductor or power-line, a number of electric batteries, a working conductor, a positive wire and a negative wire in sections insulated from one another, the sections of the positive and negative wires connected to the batteries, one for each pair of sections, by feeders, there being in one of the feeders from each battery an electro-magnet, and the sections of the working conductor connected with the power-line by feeder-wires, part of which are the armatures of the said electro-magnets, in combination with a car provided with a trolley in electrical contact with the working conductor, positive and negative wires, and also provided with a motor, and a switch-line connected with such trolley, as set forth.

In testimony whereof I affix my signature in presence of two witnesses.

MALONE WHELESS.

Witnesses:
 THOS. S. HOPKINS,
 M. C. LAW.